(12) United States Patent
Benner

(10) Patent No.: US 6,701,569 B1
(45) Date of Patent: Mar. 9, 2004

(54) WIPER PIVOT HOUSING WITH FRANGIBLE MOUNT

(75) Inventor: Mark M. Benner, Lake Orion, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 8 days.

(21) Appl. No.: 10/137,223

(22) Filed: Apr. 30, 2002

(51) Int. Cl.[7] .................................................. B60S 1/06
(52) U.S. Cl. ............... 15/250.31; 15/250.3; 296/96.15; 296/96.17; 403/2; 403/DIG. 3
(58) Field of Search .................. 15/250.3, 250.31, 15/250.34, 250.27, 250.001; 296/96.15, 96.17, 192; 403/2, DIG. 3

(56) References Cited

U.S. PATENT DOCUMENTS

| | | | | |
|---|---|---|---|---|
| 4,718,712 A | * | 1/1988 | Nakatani | 296/192 |
| 4,943,102 A | * | 7/1990 | Hamamoto et al. | 296/192 |
| 6,216,309 B1 | | 4/2001 | Goto et al. | 15/250.31 |
| 6,237,185 B1 | | 5/2001 | Goto et al. | 15/250.31 |
| 6,254,167 B1 | * | 7/2001 | Goto et al. | 296/96.15 |
| 6,505,376 B1 | * | 1/2003 | Kagawa | 15/250.31 |
| 6,513,186 B1 | * | 2/2003 | Zimmer | 15/250.31 |
| 2001/0001336 A1 | | 5/2001 | Kobayashi et al. | |
| 2001/0011831 A1 | | 8/2001 | Ohashi et al. | |
| 2002/0083544 A1 | * | 7/2002 | Masuda | 15/250.31 |
| 2003/0001407 A1 | * | 1/2003 | Hoshikawa et al. | 15/250.31 |

FOREIGN PATENT DOCUMENTS

| | | |
|---|---|---|
| EP | 0 916 559 | 5/1999 |
| EP | 1 074 442 | 2/2001 |
| EP | 1 083 101 | 3/2001 |
| GB | 2 327 598 | 2/1999 |
| GB | 2 347 340 | 9/2000 |
| JP | 11 301420 | 11/1999 |
| JP | 2000062575 | 2/2000 |
| JP | 20000326830 | 11/2000 |

* cited by examiner

Primary Examiner—Gary K. Graham
(74) Attorney, Agent, or Firm—J. Gordon Lewis

(57) ABSTRACT

A wiper apparatus for a vehicle windshield is fixedly connected by at least one mount to vehicle structure. A portion of the wiper apparatus extends exteriorly of an impact line defined by the vehicle structure. A frangible portion is formed in a mount. An energy focus member is carried on vehicle structure subject to movement during a collision and has position relative to the fracture portion of the mount so as separate the mount from the vehicle structure to allow an exterior portion of the wiper apparatus to drop below a vehicle impact line before substantial contact with a pedestrian.

17 Claims, 3 Drawing Sheets

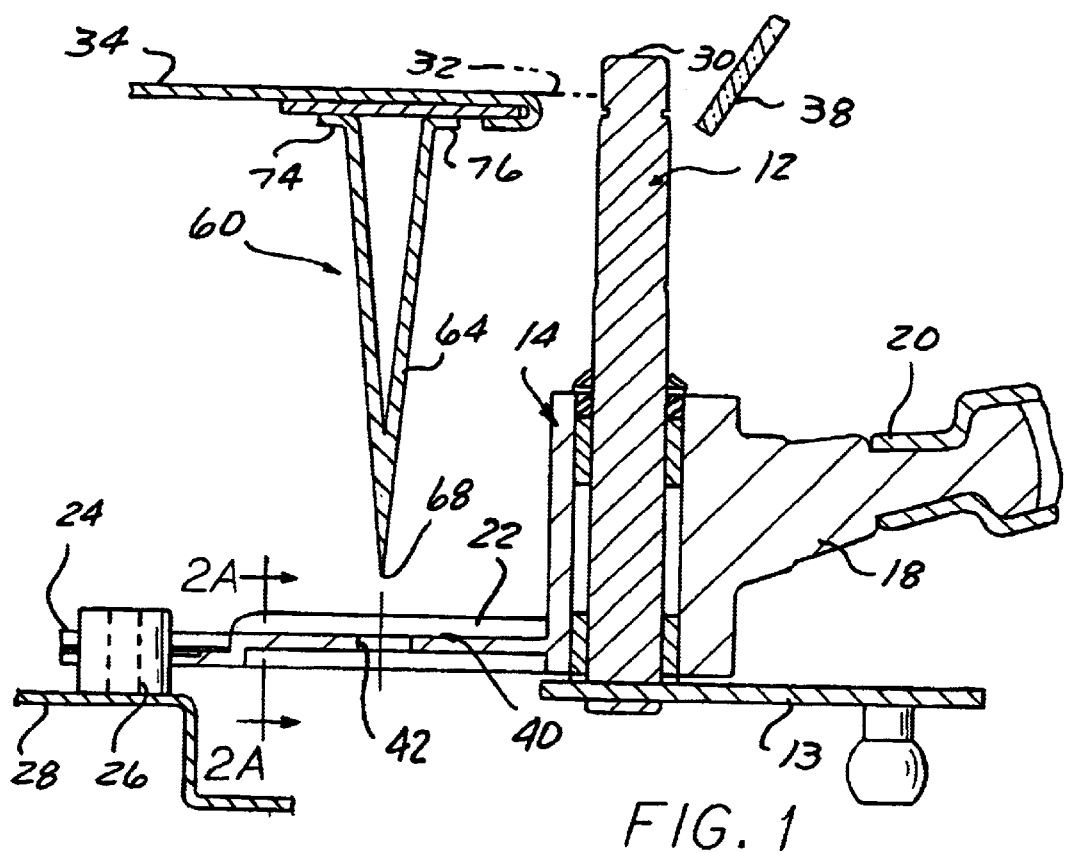
FIG. 1
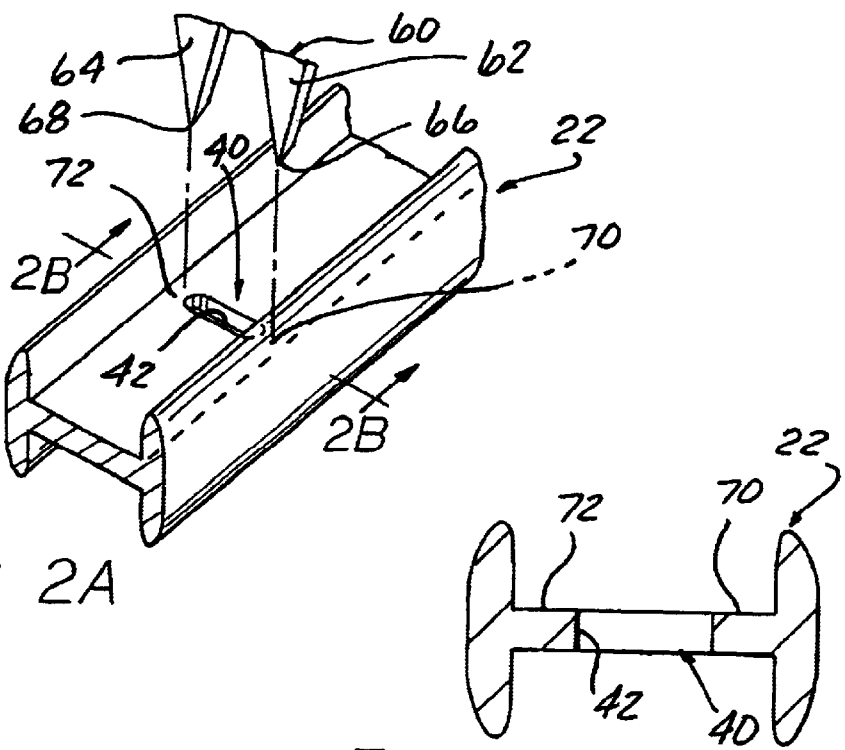
FIG 2A
FIG 2B

WIPER PIVOT HOUSING WITH FRANGIBLE MOUNT

BACKGROUND

The present invention relates, in general, to vehicle windshield or wiper assemblies and, more specifically, to vehicle windshield wiper assemblies having pedestrian collision safety features.

In vehicle windshield wiper assemblies, wiper blades are mounted on wiper arms. The wiper arms, in turn, carry a mount which is attached to a rotatable pivot shaft. The pivot shaft is rotatably mounted in a pivot shaft housing or holder fixedly mounted on vehicle structure, such as on the vehicle plenum or cowl panel immediately below the lower edge of the vehicle windshield. Linkages connect the pivot shaft of one wiper arm to the pivot shaft of the other wiper arm to impart reciprocal motion to both wiper arms when the motor reciprocally drives the one pivot shaft.

Recent studies have shown that pedestrians have a high likelihood of injury when struck by a vehicle traveling at certain speeds. Such injuries occur when the pedestrian is thrown by impact with the front bumper or front edge of the vehicle hood onto the hood where the pedestrian's head and/or torso then contacts the windshield area with considerable force.

Although windshield wiper assemblies are provided in a large number of different configurations, typical wiper assemblies have the upper end of the pivot shaft and, the wiper arm attached thereto protruding above an impact line nominally defined by the exterior surface of the vehicle hood. As the pivot shaft, although rotatable in the pivot holder, is nevertheless fixed relatively to the vehicle structure, the protruding portions of the pivot shaft act as a fixed object which increases the likelihood of serious injury to a pedestrian during a collision between the pedestrian and a vehicle.

Certain countries or regional groups have initiated legislation to protect pedestrians and other road users in the event of a collision with a vehicle. Under such legislation, manufacturers will have to insure that the pivot shafts do not act as an external projection during a pedestrian collision with a vehicle.

As a result, windshield wiper manufacturers have provided a number of pivot shaft mounting arrangements which are capable of pivoting below the hood impact line or breaking away from the fixed mount to the vehicle structure and dropping below the vehicle hood so as to lower the protruding portion of the pivot shaft and the wiper arm below the impact line during a pedestrian collision. Such mounting arrangements rely on an impact force of a predetermined amount between the pedestrian and/or the vehicle hood which typically crumples and moves out of its normal position during a collision to initiate the pivoting or break away movement of the pivot shaft from its fixed mount to the vehicle structure.

One such pivot housing mounting arrangement has a weakened portion formed in the arm extending between the pivot shaft holder to the mounting end which is fixedly attached to the vehicle. Impact of the hood and/or the pedestrian with the pivot shaft above a predetermined force level results in a fracture and breaking away of the pivot shaft holder from the mounting end of the arm thereby allowing the pivot shaft holder to drop below the hood to minimize a fixed impact with a pedestrian thrown onto the hood during a collision with the vehicle.

However, it has been found that the force loading on the pivot shaft housing generated during impact of a pedestrian thrown onto the vehicle hood during a collision with the vehicle can vary considerably depending upon the angle of impact between the pedestrian and the protruding end of the pivot shaft. This could result in only a portion of the impact force being transmitted to the pivot housing which may be insufficient to initiate the fracture and breakaway of the pivot housing thereby resulting in the wiper pivot housing remaining as a fixed external object which can contact the pedestrian.

It is also known that vehicle hoods are designed as energy absorbing crumple panels which absorb a portion of collision impact forces. Thus, during a collision between the vehicle and a pedestrian, the forces impacting on the hood by impact of the pedestrian on the hood will initially be absorbed by deformation of the hood. This reduces the magnitude of impact forces of the pedestrian on the protruding portions of the wiper assembly which again may result in insufficient force being transmitted through the pivot shaft to the housing to initiate the break away of the pivot housing. At the same time, the wiper assembly must present a solid mount for torsional loading and radial force management.

Thus, it would be desirable to provide a vehicle windshield wiper apparatus having a break away pivot housing which overcomes the above-described problems in prior art windshield wiper systems having pedestrian impact safety capabilities. It would also be desirable to provide a vehicle windshield wiper apparatus which provides a break away or frangibility of a component of the wiper apparatus from the fixed mount to the vehicle at an earlier stage during a pedestrian collision. It would also be desirable to provide a vehicle windshield wiper apparatus in which pedestrian impact forces on the vehicle hood or cowl panel are maximized to ensure pivot shaft break away at a minimum predetermined impact force level, while, at the same time, maintaining robust operating characteristics for the wiper assembly.

SUMMARY

The present invention is a wiper apparatus having unique pedestrian impact safety features.

In one aspect of the invention, the wiper apparatus includes one or more components, such as a pivot shaft or drive motor, which are fixedly connected to stationary vehicle structure via a mount. A fracture portion is formed in the mount which is capable of fracture under a predetermined force applied thereto to separate the wiper component from the portion of the mount fixed to the stationary vehicle structure to allow lowering of the wiper component below the vehicle structure. An energy focus member is carried on the vehicle structure subject to collision force to focus movement of the vehicle structure due to the collision force onto the fracture portion of the mount.

The energy focus member may be one or more arms fixedly carried on the vehicle structure subject to movement during a collision. The one or more arms may be provided with one or more impact ends normally disposed in proximity with the fracture portion of the mount.

The frangible portion may be defined by an aperture or slot or at least one open ended notch formed in the mount.

The unique energy focus member of the present invention ensures that a sufficient force is generated during a pedestrian collision to initiate separation of the mount from the end fixed to the vehicle structure so as to allow the wiper component to lower below the vehicle hood impact line earlier in time in the collision sequence so as to ensure that external portions of the wiper apparatus have safely moved below the impact line before a pedestrian can contact such external portions.

In one aspect of the invention, the wiper component fixed to the vehicle structure via the mount is a wiper pivot housing carrying a rotatable wiper arm pivot shaft. At least an end portion of the pivot shaft extends externally of the vehicle impact line in a normal mounting position. In another aspect, the frangible portion of the mount engaged by the energy focus member fixedly connects the wiper apparatus drive motor and/or the wiper apparatus frame to the stationary vehicle structure. In this aspect, fracture of the mount by the energy focus member allows the drive motor and/or frame to lower to prevent contact with a pedestrian thrown on the vehicle hood during a collision.

The unique energy focus member of the present invention may be easily implemented in a low cost manner to initiate the fracture and separation of one or more of wiper apparatus mounts to the vehicle. In addition, the energy focus member uniquely directs the collision forces generated by the vehicle hood into the fracture portion of the mount. This overcomes the problem with previous frangible pivot housing designs in which the force directed only along the longitudinal axis of the pivot shaft which causes the separation of the pivot housing from the fixed mounting end of the pivot housing varied considerably depending upon the angle of force impact on the exposed portions of the wiper apparatus. The present energy focus member and frangible mount also enables the entire wiper apparatus to have a robust design to resist radial force and torsional loads during normal wiping operation without compromising the pedestrian's safety features afforded by the frangible mount and energy focus member of the present invention

BRIEF DESCRIPTION OF THE DRAWING

The various features, advantages and other uses of the present invention will become more apparent by referring to the following detailed description and drawing in which:

FIG. 1 is a side elevational view of one aspect of the present invention;

FIG. 2A is a cross-sectional view generally taken along line 2A—2A in FIG. 1 showing one aspect of an energy focus member and frangible mounting arm according to the present invention;

FIG. 2B is a cross-sectional view generally taken along line 2B—2B in FIG. 2A;

DETAILED DESCRIPTION

Figure 3:
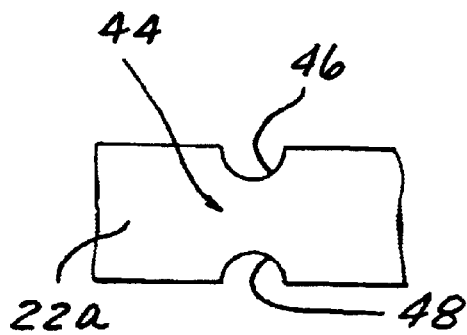
FIG. 3 is a partial, plan elevational view of another aspect of a frangible mounting arm according to the present invention.

Referring now to the drawing, and to FIGS. 1–9 in particular, there is depicted various aspects of a vehicle windshield wiper apparatus 10, which is only partially shown as the present invention employed with many different wiper apparatus configurations.

As a large number of the components in a vehicle windshield wiper apparatus are conventional, such are not shown in order that the features of the present invention may be more clearly identified. However, it will be understood that the wiper apparatus 10 utilizes a drive motor connected by a drive lever 13 to a pivot shaft 12 rotatably mounted in a pivot shaft holder or housing 14.

A tenon 18 also extends from the housing 14 and receives one end of a tube 20 for connecting rotation of the pivot shaft 12 to slave rotation of another pivot shaft, not shown, for operating the other windshield wiper on a vehicle.

An arm 22 extends from the pivot shaft housing 14 and receives a fastener 24 in a mounting end 26 for fixedly securing the pivot holder 14 to stationary vehicle structure, such as a cowl panel 28, intake plenum, etc.

As shown in FIG. 1, at least an upper portion 30 of the pivot shaft 12 is disposed exteriorly of an impact line 32 which is generally formed-by a major plane of a vehicle hood 34. As also shown in FIG. 1, the exposed end 30 of the pivot shaft 12 which receives a not shown wiper arm, is disposed adjacent to a bottom edge 36 of a vehicle windshield 38.

According to the present invention, the mounting arm 22 is provided with a weakened or frangible portion 40. The frangible portion 40 is generally defined as a reduced thickness or weakened area in the mounting arm 22 which is capable of fracture, bending or separation under a predetermined force load. Various frangible portion configurations may be provided. As shown in FIGS. 2A and 2B, one aspect of the frangible portion 40 is defined by an aperture, such as a slot 42, formed in a planar or I-beam cross-section mounting arm 22.

Figure 4:
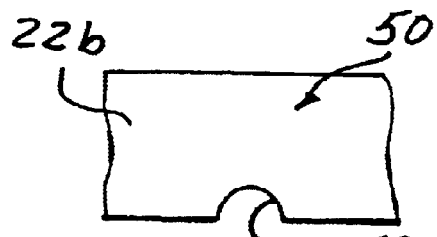
FIG. 4 is a plan elevational view of another aspect of a frangible mounting arm according to the present invention.

As shown in FIG. 3, a frangible portion 44 may be formed by notches 46 and 48 formed in opposite sides of a generally planar mounting arm 22a. In FIG. 4, a frangible portion 50 may be formed by a single notch 52 opening to one side edge of the mounting arm 22b.

The size and/or number of the aperture 42 or notches 46, 48 and 52 is determined by the amount of force required to initiate the break away and/or separation of the pivot housing 14 from the fixed mount end 26 on to the vehicle structure 28. The number and size of the aperture 42 or the notches 46, 48 and 52 will also be determined by taking into consideration the material forming the various mounting arms 22, 22a and 22b as well as the strength of the a material and by the thickness and cross-sectional shape of the mounting arms 22, 22a and 22b.

Prior art break away pivot housings which allow any exposed portions of the pivot shaft and/or the wiper arm above an impact line defined by the vehicle hood to drop below the impact line have relied on forces impacting on the pivot shaft of a sufficient level to cause deformation leading to complete separation of the pivot housing from the feed mounting end. However, it is well understood that a pedestrian and/or the vehicle hood 34 which deforms during a pedestrian collision may impact on the pivot shaft 12 in any of a large number of angles. As only force components directed along the longitudinal axis of the pivot shaft impart the forces required to initiate break away of the pivot housing 14 from the fixed mount and 24 to the vehicle 28, a sufficient force to initiate break away may not be generated in time to prevent an impact of the pedestrian with the exposed portions of the pivot shaft 12 or the wiper arm mounted thereon.

Figure 5:
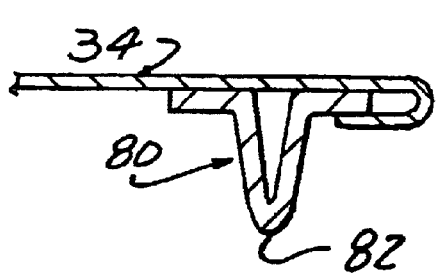
FIG. 5 is a side elevational view showing another aspect of an energy focus member according to the present invention.
Figure 6:
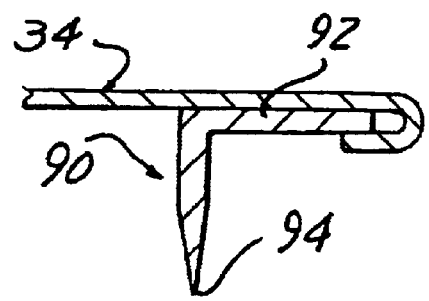
FIG. 6 is a side elevational view showing yet another aspect of an energy focus member according to the present invention.
Figure 7:
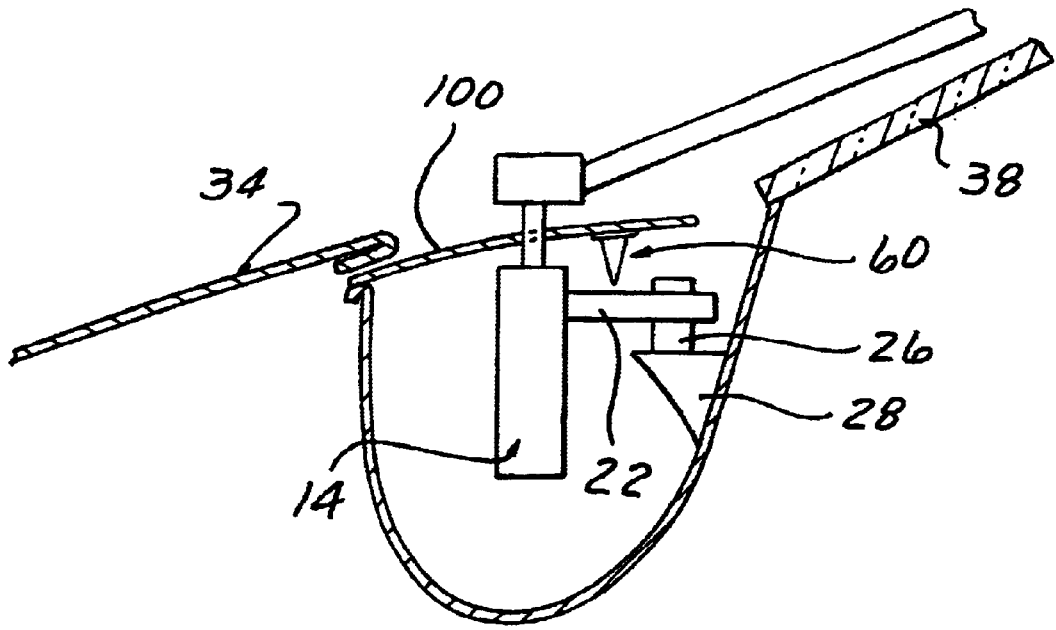
FIG. 7 is a side elevational view showing an energy focus member according to the present invention useable with a vehicle on a cowl panel.

The present invention as shown in FIG. 1, and in various aspects depicted in FIGS. 5–7 and described hereafter, employs an energy or force focus member denoted in the aspect shown in FIG. 1 by reference number 60. The energy focus member 60 is carried on a vehicle structure or panel, such as the inner surface of the vehicle hood 34 in the aspect shown in FIG. 1, or on the vehicle cowl in FIG. 7, and is aligned with or disposed in proximity or registry with the frangible portion 40 on the mounting arm 22 of the pivot housing 14. The energy focus member 60 is designed to move with movement of the vehicle panel, such as the hood 34, upon impact with the pedestrian and drive through the frangible portion 40 on the mounting arm 22 to initiate separation of the pivot housing 14 from the mount 26 which allows the exposed portions of the pivot shaft 12 and the attached wiper arm to drop below the impact line 32 to prevent contact between the exposed portions of the pivot shaft 12 and the wiper arm with a pedestrian.

The energy focus member 60 may be provided in a number of configurations consisting of one or more impact points, such as the two impact points. 62 and 64 shown in FIG. 1 or the single impact points shown in FIGS. 5–7 and described below.

In the aspect shown in FIG. 1, the energy focus member 60 is in the form of a pair of sections 62 and 64, each having a pointed apex or impact edge 66 and 68, respectively, spaced from a solid portion 70 and 72 at apposite ends of the slot 42 of the frangible portion 40 of the mounting arm 22 shown in FIG. 2A. This allows the ends 66 and 68 to impact and drive through the solid portions 70 and 72 in the frangible portion 40 to separate the pivot shaft housing 14 from the mount end 26 on the vehicle and to enable the pivot housing 14 to drop below its normal mounting position shown in FIG. 1.

It will be understood that the pair of impact points 62 and 64 may be replaced by a single larger impact point which contacts both of the solid portions 70 and 72 in the frangible portion 40 of the mounting arm 22.

The energy focus member 60 is attached to the vehicle panel, such as the inner surface of the vehicle hood 34, by any of a number of mounting means, such as welds, adhesive, mechanical fasteners, etc. Mounting ends 74 and 76 are shown in FIG. 1 as extending from one end of the impact points 62 and 64 to provide a suitable mounting surface to the inner surface of the vehicle hood 34.

A single energy focus member 80 is shown in another aspect of the present invention in FIG. 5. In this aspect, the single impact member 80, which may also include two or more separate impact points, has a blunter end 82 for distributing the separation force over a larger area of the frangible portion 40, 44 or 50 of the mounting arms 22, 22a and 22b, respectively.

In the aspect shown in FIG. 6, the energy focus member 90 is in the form of an L-shaped bracket having a mounting end 92 affixed to the inner surface of the vehicle hood 34 and an impact end 94 projecting therefrom and aligned with the frangible portion 40.

In FIG. 7, the energy focus member 60 is depicted as being mounted on a cowl screen or panel 100. This arrangement is suited for certain vehicle structures which have a relatively short length hood 34 which may not overlay the pivot housing mounting arm 22 sufficiently to enable mounting of the energy focus member 60 thereon. In this aspect of the invention, the cowl screen 100 is designed to move from its normal mounting position downward toward the mounting arm 22 after contact with the hood 34 which has moved from its normal position during a pedestrian collision with the vehicle and impact of the pedestrian on the hood 34. The operation of the energy focus member 60 in this wiper system configuration is the same as the operation of the energy focus member 60, 80 and 90 described above in that the energy focus member 60 drives into and separates the pivot shaft housing 14 from the pivot shaft mount 26.

Figure 8:
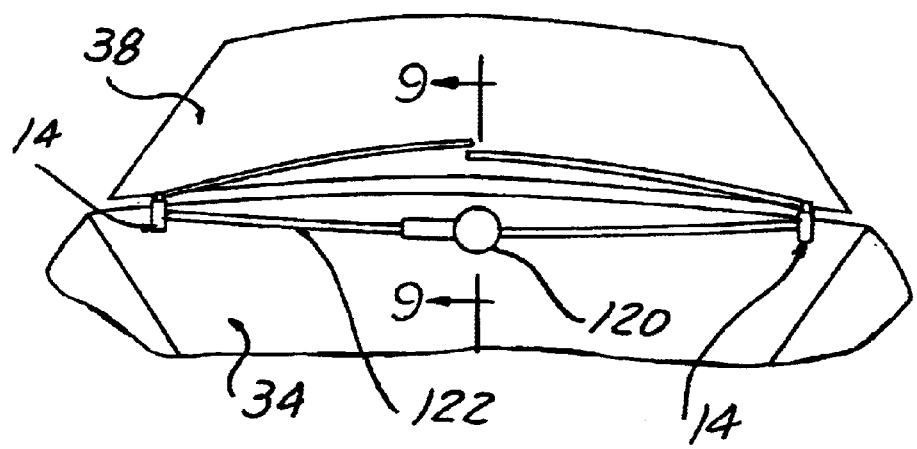
FIG. 8 is a pictorial representation of an alternate wiper system with a centrally located drive motor.
Figure 9:
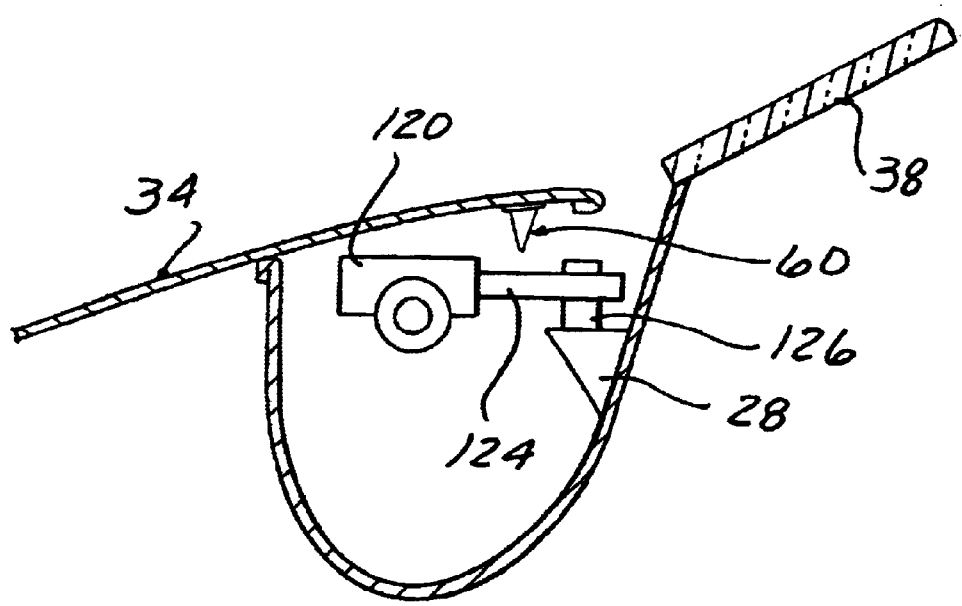
FIG. 9 is a cross-sectional view, generally taken along line 9—9 in FIG. 8 and showing the energy focus member according to the present invention usable with a wiper system drive motor mount.

In FIGS. 8 and 9, there is depicted another typical wiper system design in which a drive motor 120 is centrally mounted with respect to the lateral width of the vehicle. A frame and linkage structure denoted generally by reference number 122 connects the drive motor 100 to a pair of rotatable pivot shafts mounted in pivot housings 14 affixed to vehicle structure in the same manner as described above and shown in FIG. 1.

In this design, the drive motor 120 and/or the frame 122 may present an external projection during a pedestrian collision. Thus, the energy focus member 60, as shown in FIG. 9, is mounted on the inner surface of the vehicle hood 34 in the same manner as described above and shown in FIGS, 1–5 or, alternately, on the vehicle cowl screen 100 as shown in FIG. 7, and is disposed in close proximity to a mount 124 which fixedly connects the drive motor 120 to stationary vehicle structure via a suitable mounting fastener 126. It should be noted that a similar mount can be provided for the frame 122. The energy focus member 60 or 80 is positioned to engage and separate a frangible portion of the mount 124, during a collision to separate the drive motor 120 or frame 122 from the fixed connection to vehicle structure thereby allowing the drive motor 120 or frame 122 to drop below the vehicle impact line to minimize contact with a pedestrian thrown onto the hood 34 during a collision.

In summary, there has been disclosed a vehicle windshield wiper pivot shaft housing having a frangible portion which cooperates with a unique energy focus member mounted on a vehicle panel to ensure that sufficient force generated by movement of the vehicle panel during a pedestrian collision to separate the wiper system pivot, drive motor or frame mount to the vehicle to enable any exposed portions of the wiper system, such as the pivot shaft, drive motor or frame normally situated above the vehicle hood impact line to drop below the impact line and avoid forming a fixed projection which may be contacted by the pedestrian. The unique energy focus member of the present invention ensures that separation of the mount from the vehicle is initiated earlier in time during the collision sequence to allow sufficient time for any exposed portions of the wiper system to drop below the impact line to prevent such components acting as a fixed object to be contacted by a pedestrian thrown onto the vehicle hood. Further, the energy focus member and the fracture portion of the wiper system may be provided in a number of different configurations to enable such features to be employed in the numerous different vehicle and wiper configurations existing today. The unique energy focus member and frangible mount apparatus of the present invention provides these fixed contact avoidance features while at the same time enabling the wiper system to maintain a robust operability to resist radial and torsional loads during normal wiper operation.

What is claimed is:

1. A wiper apparatus mountable on a vehicle structure, the wiper apparatus comprising:
   a mount extending from a wiper assembly adapted for a fixed connection with vehicle structure;
   a fracture portion carried on the mount capable of fracture under a predetermined force to allow separation of the mount from the vehicle structure and lowering of the wiper assembly below the vehicle structure; and
   an energy focus member adapted to be carried on the vehicle structure subject to collision force, the energy focus member focusing forced movement of the vehicle structure due to the collision force onto the fracture portion of the mount.

2. The wiper apparatus of claim 1 wherein the energy focus member comprises:
   a member carried on the vehicle structure subject to movement, the member having an impact edge movable into forced engagement with the fracture portion of the mount under movement of the vehicle structure.

3. The wiper apparatus of claim 2 wherein:
   the member has one end, the one end carrying the impact edge disposed proximate the fracture portion of the mount.

4. The wiper apparatus of claim 1 wherein the energy focus member comprises:
   two impact edges.

5. The wiper apparatus of claim 1 wherein the fracture portion comprises:
   an aperture formed in the mount.

6. The wiper apparatus of claim 5 wherein:
   the aperture is a slot.

7. The wiper apparatus of claim 1 wherein the fracture portion comprises:
   at least one open ended notch formed in the mount.

8. The wiper apparatus of claim 1 wherein the fracture portion comprises:
   at least two opposed, open ended notches formed in the mount.

9. A wiper apparatus mountable on a vehicle structure, the wiper apparatus comprising:
   a pivot holder;
   a wiper pivot rotatably mounted in the pivot holder;
   at least one end of the wiper pivot extending exteriorly of the vehicle structure;
   a mount extending from the pivot holder and adapted to be fixedly connected to the vehicle structure;
   a fracture portion carried on the mount capable of fracture under a predetermined force to allow separation of the mount from the vehicle structure and lowering of the one end of the wiper pivot below the vehicle structure; and
   an energy focus member adapted to be carried on the vehicle structure subject to collision force, the energy focus member focusing forced movement of the vehicle structure due to the collision force onto the fracture portion of the mount.

10. The wiper apparatus of claim 9 wherein the energy focus member comprises:
    a member carried on the vehicle structure subject to movement, the member having an impact edge movable into forced engagement with the fracture portion of the mount under movement of the vehicle structure.

11. The wiper apparatus of claim 10 wherein:
    the member has one end, the one end carrying the impact edge disposed proximate the fracture portion of the mount.

12. The wiper apparatus of claim 9 wherein the energy focus member comprises:
    two impact edges.

13. The wiper apparatus of claim 9 wherein the fracture portion comprises:
    an aperture formed in the mount.

14. The wiper apparatus of claim 13 wherein:
    the aperture is a slot.

15. The wiper apparatus of claim 9 wherein the fracture portion comprises:
    at least one open ended notch formed in the mount.

16. The wiper apparatus of claim 9 wherein the fracture portion comprises:
    at least two opposed, open ended notches formed in the mount.

17. The wiper apparatus mountable on a vehicle structure, the wiper apparatus comprising:
    a frame;
    a drive motor coupled to the frame;
    at least one pivot holder rotatably carrying a wiper pivot;
    a linkage coupling the drive motor to the wiper pivot;
    at least one mount extending from one of the pivot holder, the frame and the drive motor, the mount adapted to be fixedly connected to the vehicle structure;
    a fracture portion carried on the mount capable of fracture under a predetermined force to allow separation of the mount from the vehicle structure and lowering of at least one of the one end of the wiper pivot, the drive motor and the frame below the vehicle structure; and
    an energy focus member adapted to be carried on the vehicle structure subject to collision force to focus forced movement of the vehicle structure due to the collision force onto the fracture portion of the mount.

* * * * *